United States Patent

Michelbrink et al.

[11] 3,978,977
[45] Sept. 7, 1976

[54] APPARATUS FOR INDEPENDENT ADJUSTMENT OF THE TENSION OF CONVEYOR CHAINS

[75] Inventors: Bernhard Michelbrink, Bislich; Manfred Goeke, Oberhausen, both of Germany

[73] Assignee: Babcock & Wilcox Limited, London, England

[22] Filed: Apr. 22, 1974

[21] Appl. No.: 462,727

[52] U.S. Cl. .............................................. 198/816
[51] Int. Cl.² ........................................ B65G 15/30
[58] Field of Search .................. 198/208, 189, 109; 302/14; 209/492, 257, 256, 255, 218

[56] References Cited
UNITED STATES PATENTS

| | | | |
|---|---|---|---|
| 731,713 | 6/1903 | Schou | 198/208 X |
| 3,026,992 | 3/1962 | Douglass, Jr. | 198/208 X |
| 3,161,280 | 12/1964 | Creighton et al. | 198/109 |
| 3,357,559 | 12/1967 | Israelson | 209/218 |

FOREIGN PATENTS OR APPLICATIONS 839,473  5/1959  Germany ........................... 198/208

*Primary Examiner*—Robert J. Spar
*Assistant Examiner*—James M. Slattery
*Attorney, Agent, or Firm*—J. M. Maguire

[57] ABSTRACT

A conveyor for removing pulverized fuel ash disposed within an ash extractor having two chains or belts interconnected by a plurality of cross members, each chain having an independently adjustable tensioning device which establishes a desired tension in each of the flexible chains or belts in order to eliminate any inherent slack or slack build-up as a result of frictional wear.

4 Claims, 4 Drawing Figures

APPARATUS FOR INDEPENDENT ADJUSTMENT OF THE TENSION OF CONVEYOR CHAINS

BACKGROUND OF THE INVENTION

The present invention relates generally to pulverized fuel ash extractors, and more particularly, to the conveyor system therein adapted to control the tension of both chains of the conveyor to prevent a slack buildup with time in either chain.

Pulverized fuel ash extractors generally embody a trough partially or wholly filled with water in which the ash is dispensed. Disposed within the trough is a conveyor of at least two chains or belts interconnected by cross members or drag bars spaced such that the ash falls between the bars to a bottom plate. The ash build up is then removed by the continuous movement of the drag bars along the bottom plate.

With the passage of time, the conveyor, or more particularly, the chains elongate due to friction throughout the system and a slack build up develops. In order to keep the chains taut, known tension devices, such as the one shown in German Pat. No. 839,473, are incorporated within the system, generally with two or more moveable sprockets, one for each chain. However, the tension devices of this type are generally mounted on a common shaft and are therefore unable to differentially adjust the tension of the chains to correct uneven elongation between the two chains. Furthermore, this common shaft may be slightly tilted, however, the tilting of the shaft tilts the sprocket wheels away from the direction of the chain. This misalignment between the sprockets and the chains results in accelerated wear of the chain, or increased elongation, as well as accelerated wear of the running surfaces of the sprockets. In addition, the chain is more likely to disengage itself from one of the tilled sprockets. Thus, an exchange of conveyors is required not only when the chains are completely worn out, but also when a significant differential elongation exists between two chains.

In the interest of efficiency and economy, it is clear that a reduction in conveyor exchange rates may be realized by a tension device which will elongate and/or differentially elongate.

SUMMARY OF THE INVENTION

In accordance with the invention, differential elongation of either chain is achieved through a novel tension control device which embodies a separate independently adjustable and lockable guide sprocket for each chain or belt, and screw spindles advantageously provided within or outside the trough for sprocket adjustment. Furthermore, the differential elongation of the chains does not affect the sprocket-chain alignment.

The tension control device characterizing this invention, moreover, is applicable to chain or belt conveyors having more than two chains or belts. Accordingly, each chain or belt is provided with the independently adjustable guide sprocket described in this invention.

Figure 1:
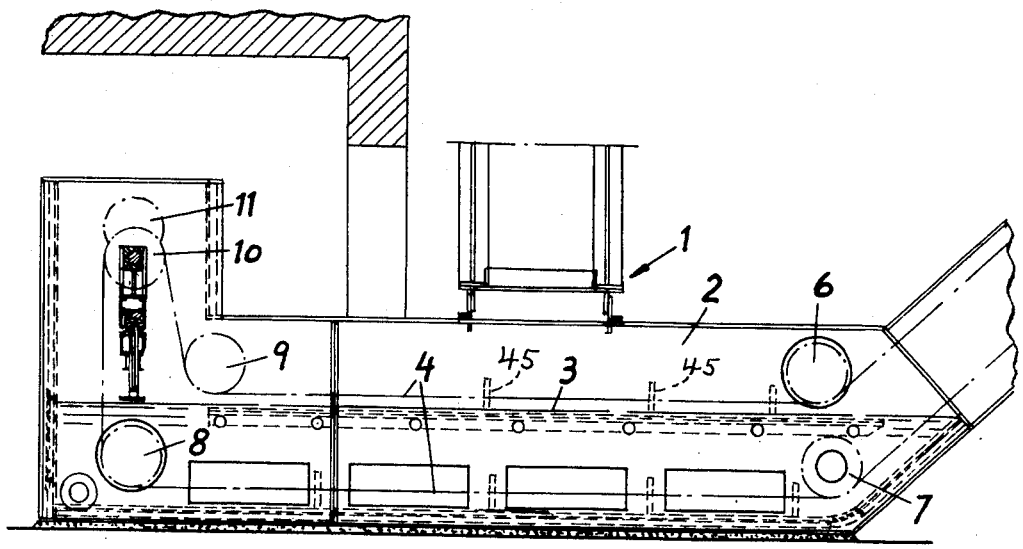
FIG. 1 shows a longitudinal section of a pulverized fuel ash extractor and conveyor having a tension device according to this invention arranged above the water level.

Attention is now directed to FIG. 1 of the drawings wherein in the general structure of a pulverized fuel ash extractor is shown. This structure includes a hopper 1 from which the material to be conveyed is discharged into a water filled trough 2 having a water level indicated by 3. The material is transported out of the trough 2 by means of a conveyor built according to this invention. In connection with the description of the conveyor, see also FIG. 2. This conveyor essentially consists of chains 4 and 5, a plurality of spaced drag bars 45, and guide sprockets 6, 7, 8 and 9. The conveyor chains are diverted from the trough to the independent guide sprockets wheel 10 and 11 by means of the guide sprockets 8 and 9.

An independent guide sprocket wheel 10 and 11 is provided for each chain or belt. The guide sprocket wheels are, moreover, independently adjustable and lockable.

Figure 2:
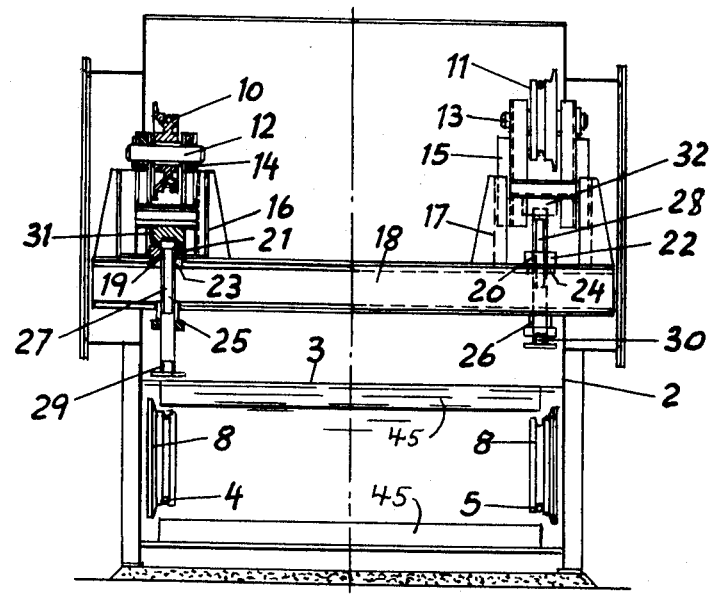
FIG. 2 shows another view partly in section of the tension device of FIG. 1.

The independent guide sprocket wheels 10 and 11 are mounted on axles 12 and 13 which are disposed on moveable slides 14 and 15. Slides 14 and 15 glide along side guides 16 and 17 supported by a beam 18. Located within the opening of each side guide 16 and 17 and welded to beam 18 is a metal member 21 and 22. The members 21 and 22 are each provided with a screw thread 19 and 20 to engage a spindle therethrough. The member 21 and 22 is located over an opening 23 and 24 in the beam 18, and is located opposite a pipe sleeve 25 and 26 attached to the beam. Screw spindles 27 and 28, disposed within the openings 23 and 24, and through the pipe sleeves 25 and 26, are threadably engaged with members 21 and 22 and project outward from both sides of the beam 18. The lower end of each screw spindle is provided with turning means 29 and 30, shown here as a hexagonal member. The upper end of the screw spindles extending outward from the beam 18 engage support pieces 31 and 32 attached to the slides 14 and 15. Turning a screw spindle 29, for example, extends or retracts the spindle and therefore, moves the slide associated therewith and the attached sprocket. In this manner differential adjustment of the chain is established. As shown in FIG. 2, the left sprocket 10 is in the lowest position while the right sprocket 11 is in the highest position.

Figure 3:
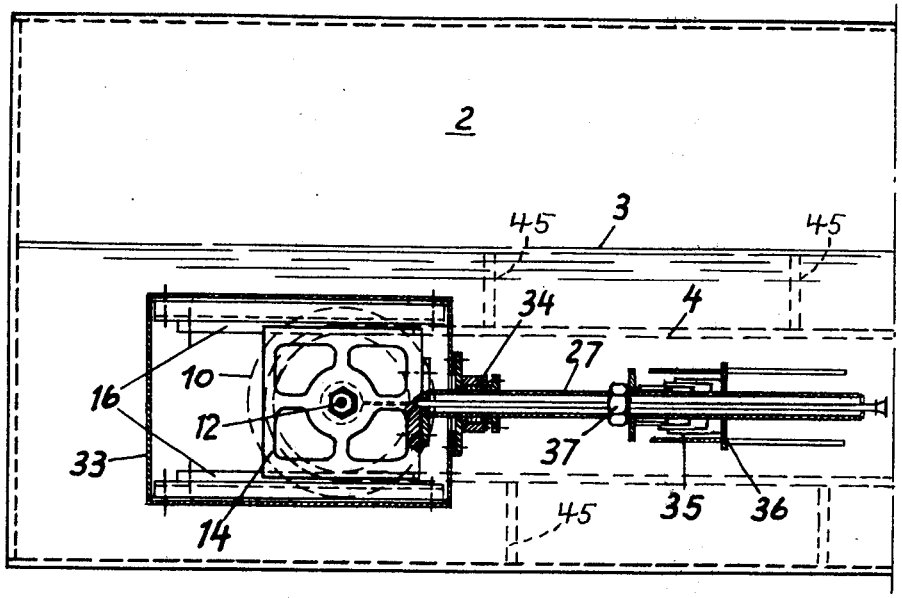
FIG. 3 shows longitudinal section of a tension device according to this invention, with the tension sprocket arranged below the water level and the screw spindle located outside the trough.
Figure 4:
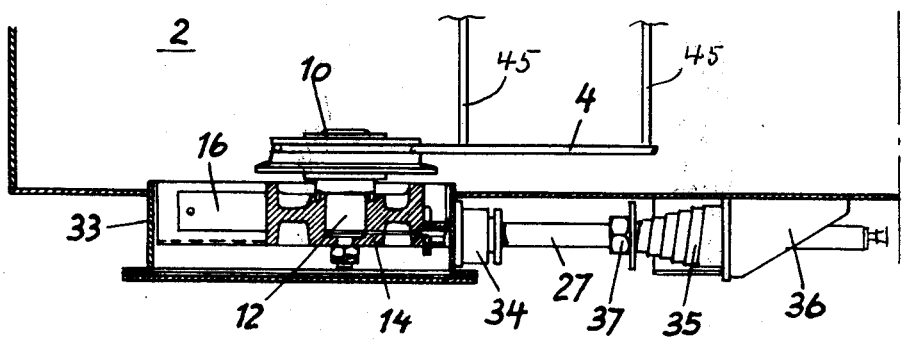
FIG. 4 shows a top view partly in section of the tension device of FIG. 3.

In a second embodiment of the invention illustrated in FIGS. 3 and 4 each tension device, of the type described above, only one being shown, is located below the water level 3. Some of the drag bars 45 are shown for clarity. The guide sprockets 10, the slide 14 and the guide 16 are housed within a box 33 attached to the side of trough 2. The screw spindle 27 penetrates the box 33 by means of a stuffing box 34, and is supported at the opposite end by a buffer spring 35 and the bracket 36, attached to the side of the trough 2. Adjustments of the sprocket wheel 10 are made by turning means 37, shown here as a nut, attached to the screw spindle. A similar tension device is located on the opposite side wall of the trough 2 (not shown) in order that independent adjustments of the chain tension is possible.

The embodiments of the invention in which an exclusive property or privilege is claimed are defined as follows:

1. A conveyor having two parallel flexible transversely connected members each having a tensioning device separately adjustable to maintain a desired tension, means for continuously moving the members in unison, each tensioning device comprising a slideable member, a guide member in which the slideable member is free to move only in a predetermined linear path, an adjustable sprocket wheel rotatable about a separate axle disposed within the slideable member, and a linearly adjustable threaded spindle having one end set against the slideable member and providing over the full range of rotation of the spindle linear movement to the slideable member to adjust the tension of the flexible member.

2. A conveyor according to claim 1 in combination with a water filled trough positioned to receive ash.

3. A conveyor according to claim 2 having the sprocket wheel disposed above the water level.

4. In combination with a water filled trough positioned to receive ash, a conveyor having two parallel flexible members transversely connected, means for continuously moving the parallel flexible members in unison, each flexible member having a tensioning device separately adjustable to maintain a desired tension in each parallel flexible member, an adjustable sprocket wheel disposed under water, each of said wheels being rotatable about a separate axle disposed within a slideable member, a guide member in which the slideable member is free to move in a predetermined path, a threaded spindle moveable relative to a fixed position, one end of which is disposed against the slideable member, means for rotating the threaded spindle to move the slideable member and adjust the tension of the flexible member, wherein the threaded spindle extends out of the trough through a stuffing box.

* * * * *

UNITED STATES PATENT AND TRADEMARK OFFICE
CERTIFICATE OF CORRECTION

PATENT NO. : 3,978,977
DATED : September 7, 1976
INVENTOR(S) : B. Michelbrink et al It is certified that error appears in the above–identified patent and that said Letters Patent are hereby corrected as shown below:

Column 1, line 38 "tilled" should read --tilted--.

Column 2, line 1 --a-- should be inserted between "shows" and "longitudinal".

Column 2, line 46, "a" should be deleted.

Column 2, line 57 "sprockets" should read --sprocket--.

Signed and Sealed this

Twenty-second Day of August 1978

[SEAL]

Attest:

RUTH C. MASON
Attesting Officer

DONALD W. BANNER
Commissioner of Patents and Trademarks